United States Patent
Reid

(10) Patent No.: US 11,270,802 B1
(45) Date of Patent: Mar. 8, 2022

(54) CREEP AND CASCADE FAILURE MITIGATION IN HEAT PIPE REACTORS

(71) Applicant: Triad National Security, LLC, Los Alamos, NM (US)

(72) Inventor: Robert Stowers Reid, Santa Fe, NM (US)

(73) Assignee: Triad National Security, LLC, Los Alamos, NM (US)

( * ) Notice: Subject to any disclaimer, the term of this patent is extended or adjusted under 35 U.S.C. 154(b) by 324 days.

(21) Appl. No.: 16/186,090

(22) Filed: Nov. 9, 2018

Related U.S. Application Data

(60) Provisional application No. 62/595,714, filed on Dec. 7, 2017.

(51) Int. Cl.
| | |
|---|---|
| G21C 15/257 | (2006.01) |
| F28D 15/02 | (2006.01) |
| G21C 15/18 | (2006.01) |
| F28D 15/06 | (2006.01) |
| F28D 21/00 | (2006.01) |

(52) U.S. Cl.
CPC ....... *G21C 15/257* (2013.01); *F28D 15/0275* (2013.01); *F28D 15/06* (2013.01); *G21C 15/18* (2013.01); *F28D 2021/0054* (2013.01)

(58) Field of Classification Search
CPC ... G21C 15/257; G21C 15/18; F28D 15/0275; F28D 15/06; F28D 15/00; F28D 15/02; F28D 15/04; F28D 2021/0054; H05K 7/20336; H05K 7/20663
See application file for complete search history.

(56) References Cited

U.S. PATENT DOCUMENTS

| | | | | | |
|---|---|---|---|---|---|
| 3,525,386 | A | * | 8/1970 | Grover | H01M 8/04067 165/272 |
| 3,613,773 | A | * | 10/1971 | Hall | H01J 45/00 165/273 |
| 3,812,905 | A | * | 5/1974 | Hamerdinger | F28D 15/06 165/274 |
| 4,047,561 | A | * | 9/1977 | Jaster | H01L 23/473 165/278 |
| 4,851,183 | A | * | 7/1989 | Hampel | F28D 15/00 376/274 |
| 5,044,426 | A | * | 9/1991 | Kneidel | F28D 15/06 165/272 |
| 5,082,617 | A | * | 1/1992 | Walter | F28D 15/06 376/184 |
| 6,675,887 | B2 | * | 1/2004 | Garner | F28D 15/0275 165/104.14 |
| 7,272,941 | B2 | * | 9/2007 | TeGrotenhuis | B01D 5/0015 62/93 |
| 9,810,483 | B2 | * | 11/2017 | Bilski | F28D 15/0275 |
| 2016/0027536 | A1 | * | 1/2016 | McClure | G21C 1/02 376/277 |
| 2018/0059746 | A1 | * | 3/2018 | Sato | F28D 15/0266 |
| 2018/0216896 | A1 | * | 8/2018 | Bilski | F28D 15/0275 |

FOREIGN PATENT DOCUMENTS

CN 103377732 A * 10/2013 ............. F28D 15/02

* cited by examiner

*Primary Examiner* — Darlene M Ritchie
(74) *Attorney, Agent, or Firm* — Alston & Bird LLP

(57) ABSTRACT

Technique(s) to mitigate creep and/or cascade failure in high temperature heat pipe reactor cores may include gas loading each heat pipe such that when one or more heat pipes in the heat pipe array fail, the adjacent heat pipes can accommodate added heat load with little change in temperature.

17 Claims, 5 Drawing Sheets

200

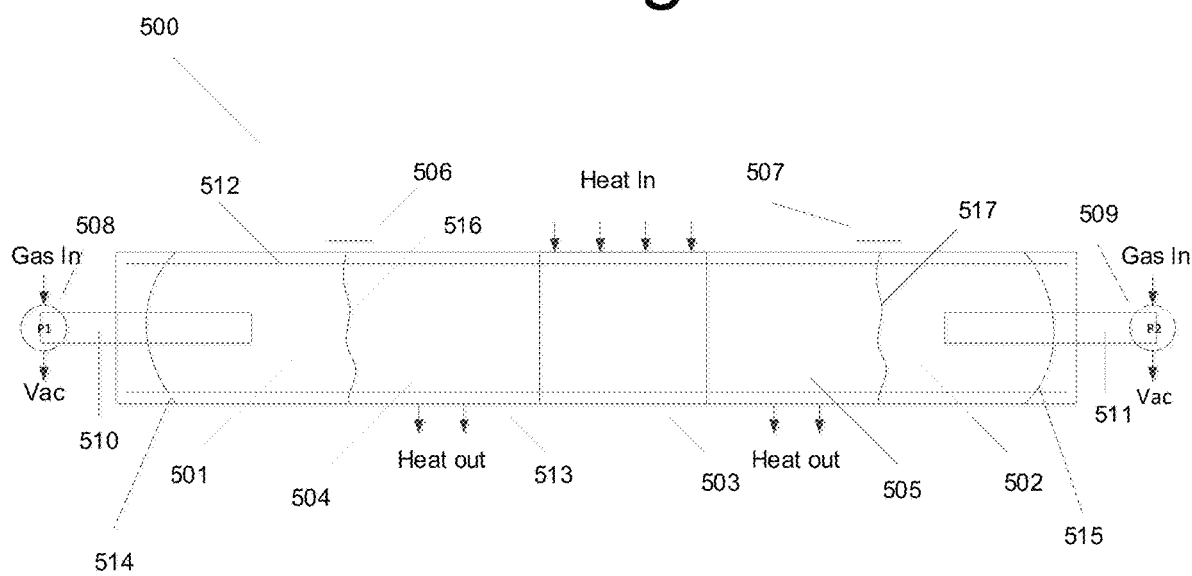

CREEP AND CASCADE FAILURE MITIGATION IN HEAT PIPE REACTORS

CROSS-REFERENCE TO RELATED APPLICATION

This application claims the benefit of U.S. Provisional Patent Application No. 62/595,714 filed on Dec. 7, 2017. The subject matter of this earlier filed application is hereby incorporated by reference in its entirety.

STATEMENT OF FEDERAL RIGHTS

The United States government has rights in this invention pursuant to Contract No. 89233218CNA000001 between the United States Department of Energy and Triad National Security, LLC for the operation of Los Alamos National Laboratory.

FIELD

The present invention relates to heat pipe reactors, and more particularly, to creep and cascade failure mitigation techniques in high temperature heat pipe reactor cores.

BACKGROUND

There are two types of heat pipes—variable conductance heat pipes and fixed conductance heat pipes. When non-condensable gas is added to a (fixed-conductance) heat pipe, the heat pipe becomes a variable conductance heat pipe. In this case, the non-condensable gas stays in a gaseous state, i.e., the gas does not have a phase change. For heat pipes operating above cryogenic temperature, non-condensable gas may include helium, argon, or neon, for example. When there is a vaporization in the hot zone, vapor and non-condensable gas is pushed to the cold end. The vapor condenses and returns to the evaporator, while the non-condensable gas stays at the cold end. With non-condensable gas staying at the cold end, the non-condensable gas creates a cold nonactive region (or zone). The non-condensable gas may block part of the condenser, preventing heat transfer to a heat exchanger. Further, if power is raised in the heat pipe by 20 percent, for example, the heat pipe becomes hotter and vapor pressure goes up. This causes the non-condensable gas to be pushed further down the heat pipe, reducing the heat pipe temperature.

When a fixed conductance heat pipe (with no gas within) fails, the local temperature of the reactor core increases near the failed heat pipe. For example, assume there is a core block with a plurality of heat pipes. When one of these heat pipes fails, adjacent fuel pins transfer heat to the other heat pipes, which surround the failed heat pipe, raising local temperature and creating hot spots.

To prevent these hot spots, the power of the reactor core can be reduced. However, by reducing the power of the reactor core, the overall reactor core temperature is reduced. If, for example, the failed heat pipe increases in temperature, the temperature of the heat pipe reactor core must be reduced to keep the reactor core materials from creeping. This reduction in overall temperature may be large enough to cause the heat pipes to stop operating.

When a heat pipe fails, the heat pipes, which are near the failed heat pipe, may absorb heat from the fuel pins, which are adjacent to the failed heat pipe. This heat may move the adjacent heat pipes closer to limit curves, often times referred to as the capillary or boiling limit curves. With variable conductance heat pipes, the adjacent heat pipes are placed on a different trajectory with respect to the heat pipe limits, e.g., the capillary limit. When the heat pipes adjacent to the failed heat pipe reach one or more limit curves, the adjacent heat pipes may begin to fail one after another, causing other heat pipes to fail leading in a cascading failure of heat pipes in and/or across the reactor core.

Thus, an alternative technique to mitigate creep and cascading failure in a high temperature reactor core may be beneficial.

SUMMARY

Certain embodiments of the present invention may provide solutions to the problems and needs in the art that have not yet been fully identified, appreciated, or solved by current heat pipe reactor core technologies. For example, some embodiments generally pertain to gas loaded heat pipes to prevent or mitigate creep or cascade failure in a heat pipe reactor core.

In an embodiment, an apparatus may include an array of heat pipes surrounded by a matrix of fuel. Each of the heat pipes in the array of heat pipes are gas loaded, mitigating or preventing creep or a cascade failure when a heat pipe in the array of heat pipes fails.

In another embodiment, an apparatus is configured to mitigate creep in a high temperature heat pipe reactor core (reactor core) under a failed condition. The apparatus includes a plurality of fuel pins within the reactor core and a plurality of variable conductance heat pipes (heat pipes) within the reactor core. Each fuel pin of the plurality of fuel pins is surround by a predefined number of heat pipes. When one or more of the heat pipes fail, one or more heat pipes adjacent to the one or more failed heat pipes absorb heat from a fuel pin adjacent to the one or more failed heat pipes. The heat pipes non-adjacent to the one or more failed heat pipes remain at a stable temperature.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 5 is a diagram illustrating a dual ended heat pipe reactor core, according to an embodiment of the present invention.

DETAILED DESCRIPTION OF THE EMBODIMENTS

Some embodiments of the present invention generally pertain to mitigating creep in high temperature heat pipe reactor core by maintaining heat pipe temperature under a failed condition. Creeping may be defined as a material deformation causing permanent shape change at stresses below the material yield point in elevated temperature metals. A failed condition may be induced by creep, corrosion, manufacturing defects, external damage, juvenile related mortality, performance related mortality, age related mortality, and externally induced mortality to name a few.

In an embodiment, creep in a high temperature heat pipe reactor core is mitigated using variable conductance heat pipes. The core may include an array of heat pipes surrounded by a matrix of fuel. If, for example, one of the heat pipes fail, surrounding heat pipes must absorb heat from the fuel matrix (or fuel pins) between failed and non-failed heat pipes. Depending on the configuration of the heat pipes, the adjacent non-failed heat pipes may have an additional heat load due to the failed heat pipe. This load may increase the temperature of conventional fixed conductance non-failed heat pipes that are near the failed heat pipe. The temperature may increase to the point where creep becomes a concern in the core block and fuel matrix. In some embodiments, heat pipes adjacent to a failed heat pipe may be maintained within acceptable temperature limits by gas loading every heat pipe in the array.

By gas loading each heat pipe, when one or more heat pipes in the heat pipe array fail, the adjacent heat pipes can accommodate added heat load with little change in temperature. The gas loading of the heat pipes may mitigate creep or cascade failure in the reactor core.

Figure 1:
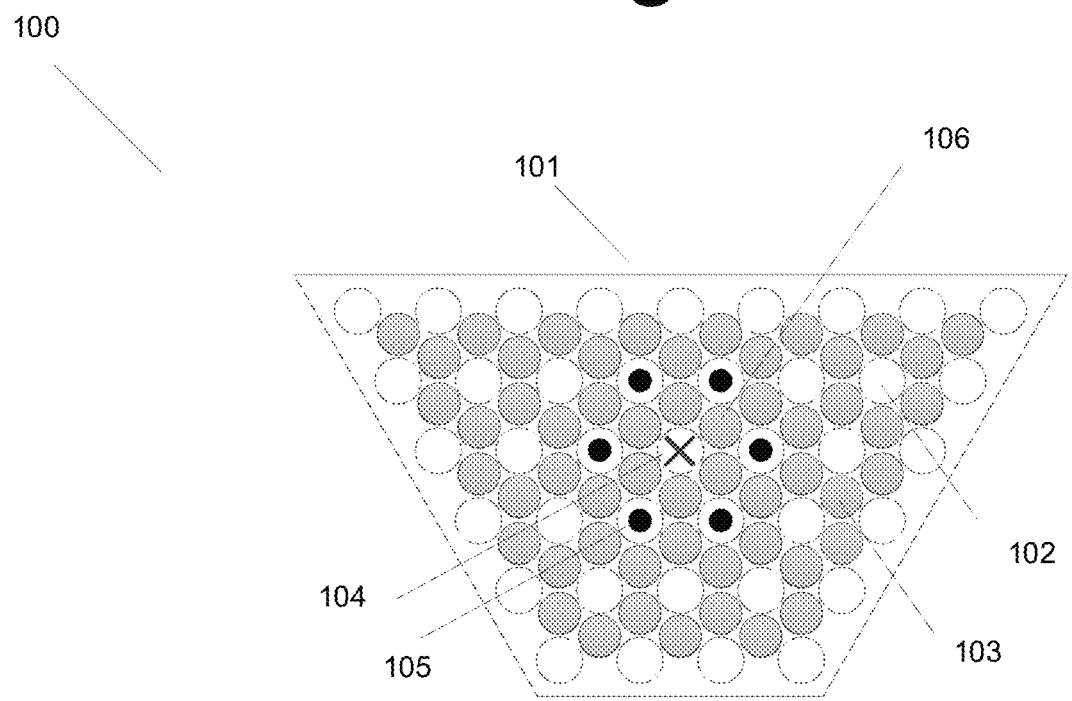
FIG. 1 is a diagram illustrating a heat pipe reactor core, according to an embodiment of the present invention.
Figure 3:
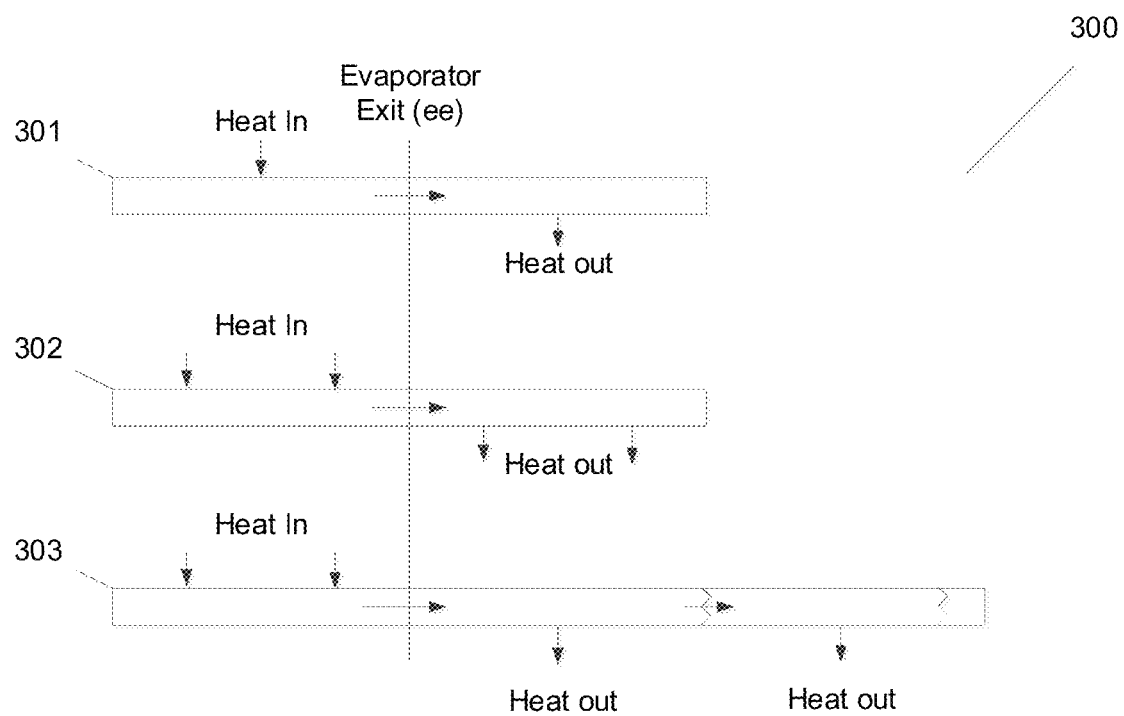
FIG. 3 is a diagram illustrating difference between nominal single ended heat pipe, fixed conductance single ended heat pipe adjacent to a failed heat pipe, and gas loaded single ended variable conductance heat pipe adjacent to a failed heat pipe, according to an embodiment of the present invention.
Figure 4:
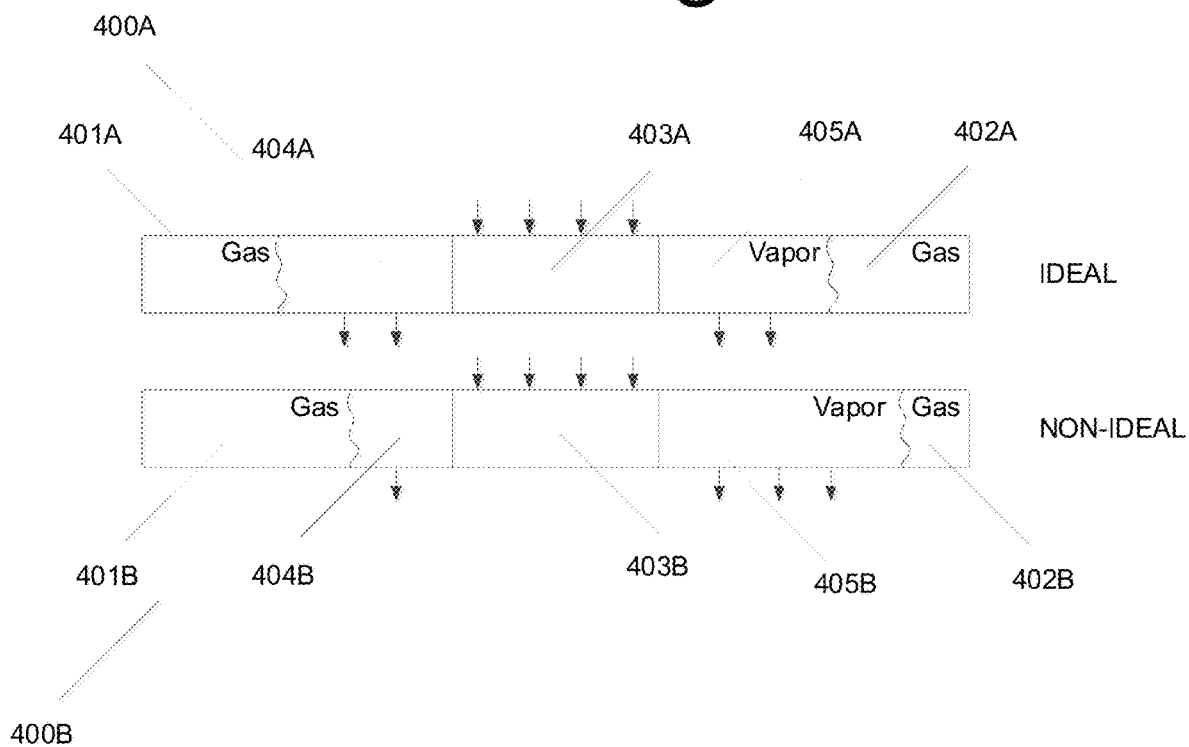
FIG. 4 is a diagram illustrating an ideal and non-ideal dual ended heat pipe, according to an embodiment of the present invention.

FIG. 1 is a diagram illustrating a heat pipe reactor core 100, according to an embodiment of the present invention. FIG. 1 may be used to illustrate a single ended heat pipe as shown in FIG. 3 or a dual ended heat pipe as shown in FIGS. 4 and 5. In an embodiment, heat pipe reactor core 100 may include one or more monolithic blocks 101 that contain a plurality of heat pipes 102 and fuel pins 103. In some embodiments, moderators may be within heat pipe reactor core 100.

In other embodiments, heat pipe reactor core 100 may include an array of individual heat pipes or clusters of heat pipes, and fuel (not shown). In this or other embodiments, heat pipe reactor core 100 may also include heat pipe moderators and heat pipe fuel modules. This embodiment assumes that heat pipe 104 fails, and the failure of heat pipe 104 causes surrounding heat pipes 105 to absorb heat from fuel pins 106, which are located between failed heat pipe 104 and surrounding heat pipes 105. Other heat pipes that are not surrounding the failed heat pipe 104 may remain at or near normal condition.

To prevent reactor core 100 from creeping, surrounding heat pipes 105 are kept at the same or similar temperature as heat pipes 102. For example, all heat pipes within monolithic block 101 are gas loaded. This way, when one or more heat pipes in the array of heat pipes fail, the adjacent heat pipes in the heat pipe array accommodate the added heat load with little or no change in temperature. This embodiment is not limited to a single heat pipe failure and may extend to multiple adjacent or non-adjacent heat pipe failures.

By gas loading the heat pipes in monolithic block 101, a failure cascade can be averted. For example, a failure of heat pipe 104 will not induce subsequent failures in heat pipes 102 or 105.

Figure 2:
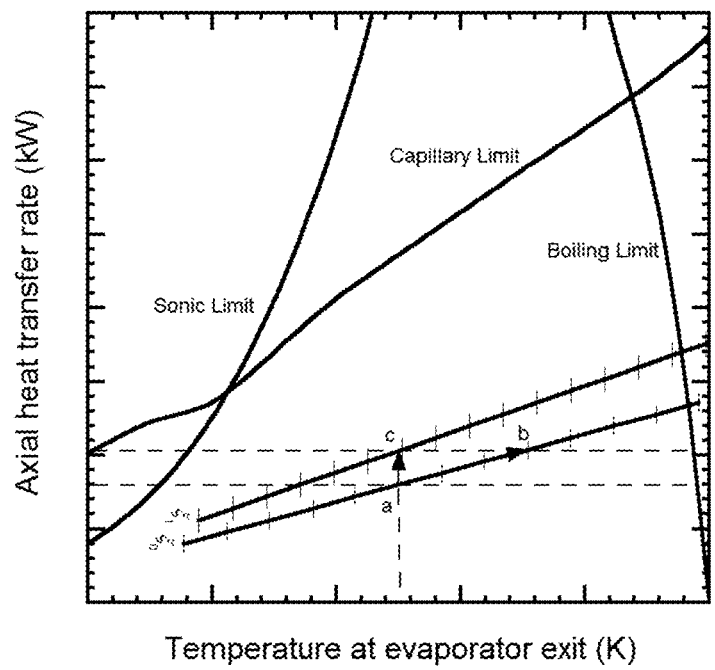
FIG. 2 is a graph illustrating heat pipe limit curves and the change in heat pipe temperature when a heat pipe fails, according to an embodiment of the present invention.

FIG. 2 is a graph 200 illustrating heat pipe limit curves and the change in heat pipe temperature when a heat pipe fails, according to an embodiment of the present invention. Graph 200 shows the advantages of gas loaded heat pipes. For example, when a fixed conductance adjacent heat pipe absorbs heat from a fuel pin near the failed heat pipe, graph 200 shows temperature increasing from point a to point b at the higher power level.

Now with gas loaded heat pipes, when variable conductance adjacent heat pipes absorb heat from the fuel pins near the failed heat pipe, the vapor pressure pushes the non-condensable gas opening up area in the condenser and placing the heat pipe onto another coupling curve, represented by point c. Point c in this illustration has the same power level as point b and near the same temperature as point a. Thus, the temperature of the adjacent heat pipe remains nearly the same, despite an increase in heat load from point a to point c at a higher temperature and power level. Simply put, as temperature increases from point a to point b, the heat pipe moves closer to the boiling limit curve. Moving from point a to point c, the heat pipe moves closer to the capillary limit curve. The percentage change to the boiling limit curve is greater than the percentage change to the capillary limit curve.

FIG. 3 is a diagram 300 illustrating difference between nominal single ended heat pipe 301, fixed conductance single ended heat pipe 302 adjacent to a failed heat pipe, and gas loaded single ended variable conductance heat pipe 303 adjacent to a failed heat pipe, according to an embodiment of the present invention. For purposes of simplicity, the term "heat pipe" will be used instead of the "single ended heat pipe" for purposes of describing FIG. 3. Diagram 300 shows heat being absorbed from the fuel pins near the failed heat pipe. For example, with nominal heat pipe 301, heat is absorbed forming vapor that passes through evaporator exit (ee). The vapor then condenses and is rejected (shown by heat out) to a heat exchanger adjacent to the condenser. With fixed conductance heat pipe 302, additional heat is added from the fuel pins near the failed heat pipe raising the temperature of heat pipe 302. This additional heat is also absorbed forming vapor that passes through evaporator exit (ee). The vapor then condenses and is rejected (shown by the increased heat out) to a heat exchanger adjacent to the condenser.

With gas loaded variable conductance heat pipe 303, additional heat is added from the fuel pins near the failed heat pipe. However, in this embodiment, the gas is compressed from the left side of the heat pipe condenser to the right side of the heat pipe condenser, increasing the surface area in the condenser exposed to the heat exchanger and keeping the heat pipe near a constant temperature.

FIG. 4 is a diagram illustrating an ideal dual ended gas loaded heat pipe 400A and non-ideal dual ended gas loaded heat pipe 400B, according to an embodiment of the present invention. For an ideal dual (or double) ended gas loaded heat pipes (hereinafter "heat pipes"), there is an assumption that gas sweeps equally to each end of the heat pipe. It should be appreciated that a dual or doubled ended gas loaded heat pipe may refer to a heat pipe with a single evaporator and opposing condensers on either side of the evaporator. This is depicted by heat pipe 400A. For instance, with heat pipe 400A, heat is absorbed at evaporator 403A and vapor moves towards condensers 404A and 405A. In this embodiment, equal amounts of heat may be dissipated at condensers 404A and 405A due to the equal amounts of gas in regions 401A and 402A on opposing sides of heat pipe 400A.

Although a single evaporator is shown in FIG. 4, some embodiments may include dual evaporators and a single condenser. For example, 404A and 405A may be evaporators and 403A may be a condenser. It should be appreciated that the arrangements and numbers of the condensers and evaporators are not limited to the diagram illustrated in FIG. 4.

In other embodiments, small asymmetric flow or boundary conditions may cause the gas to unevenly sweep to different ends of the heat pipe, as shown in the non-ideal configuration of heat pipe 400B. For example, similar to heat pipe 400A, heat is absorbed at evaporator 403B and vapor moves towards condensers 404B and 405B. In this embodiment, however, unequal amounts of heat may be dissipated at condensers 404B and 405B due to the unequal amounts of gas in regions 401B and 402B on opposing sides of heat pipe 400B.

To resolve this issue, gas may be injected actively to opposing ends of the heat pipe, with gas extraction as required. This may require for a determination of the interface between vapor and the gas in condensers, to allow the right amount of gas to be present at each end of the heat pipe. See, for example, FIG. 5, which is a diagram illustrating a dual ended heat pipe reactor core 500, according to an embodiment of the present invention. Similar to FIG. 4, heat is absorbed by evaporator 503, and is transferred to condensers 504 and 505. Gas from gas regions 501 and 502 and vapor at condensers 504 and 505 interface at 516, 517. The location of 516 and 517 is determined by the amount of gas in gas regions 501 and 502 injected through reentrant tube 510 and 511. For example, gas may be injected through valves (or controller) 508 and 509, and may be transferred into gas regions 501 and 502 by way of reentrant tubes 510 and 511. Tubes 510 and 511 are reentrant tubes to avoid liquid from entering tubes 510 and 511.

In some embodiments, gas may be removed from gas regions 501 and 502 by evacuation through valve 508 and 509. By controlling gas injection and evacuation, the location of interfaces 516, 517 can be controlled. This may change the amount of heat transfer area in condensers 504 and 505. In certain embodiments, valves 508 and 509 may control gas injected and gas removed to achieve the ideal symmetry of the gas on either side of heat pipe 500.

In some embodiments, interface locations 516 and 517 may be controlled. For example, feedback from sensors 506 and 507 may be linked through proportional integral derivative controllers P1 and P2 to valves 508 and 509. Sensors 506 and 507 are placed along a length of each heat pipe of the plurality of heat pipes to control location of gas vapor interface. Sensors 506 and 507 may include thermocouples or fiber Bragg gratings, for example.

Heat pipe 500 contains wicks 512 and 513 and excess liquid regions 514 and 515. For this embodiment, wicks 512 and 513 may be a high capacity, compound wick, such as annular, artery, screen covered groove, or a sintered artery wick. Due to the natural thermal expansion of the working fluid of heat pipe 500, excess liquid accumulates at the ends of heat pipe—excess liquid regions 514 and 515.

In some instances, gas may enter into an annulus, which is between wicks 512 and 513 and the wall of heat pipe 500, or an artery (not shown). Gas injection and removal above a liquid metal heat pipe working fluid to wall critical wetting temperature prevents gas introduction into the annulus or artery of heat pipe 500. This maintains capillary continuity of wicks 512 and 513. The critical wetting temperature is where oxides are fully reduced from metal in the wall and the wick of heat pipe 500 by the working fluid of heat pipe 500. Above the critical wetting temperature, the wall is substantially or completely wetted by the working fluid.

It should be appreciated that heat pipe 500 may include a plurality of heat exchangers. By injecting gas asymmetrically into heat pipe 500, heat exchangers in contact with condensers 504 and 505 may be heated asymmetrically. In other words, by moving the gas back and forth, heat exchangers may be selectively activated.

Embodiments having constant heat flux or heat addition, control of temperature of heat pipe 500 may be desirable. For example, gas injection may be used to control pressure (e.g., saturation vapor pressure) of heat pipe 500 and the location of interface 516 and 517, thereby controlling the temperature (e.g., saturation vapor temperature) of heat pipe 500.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
an array of gas loaded heat pipes that surround one or more fuel pins; and
a heat pipe reactor core comprising one or more monolithic blocks,
wherein each of the one or more monolithic blocks comprises the array of gas loaded heat pipes, the one or more fuel pins, or both,
wherein, in response to a reduction in heat transfer capacity of one or more failed gas loaded heat pipes in the array of gas loaded heat pipes, one or more operational gas loaded heat pipes in the array of gas loaded heat pipes are configured to mitigate creep or a cascade failure
wherein the one or more operational gas loaded heat pipes adjacent to the one or more failed gas loaded heat pipes are configured to absorb additional heat from the one or more fuel pins located next to or between the one or more failed gas loaded heat pipes and the one or more operational gas loaded heat pipes,
wherein each operational gas loaded heat pipe in the array of gas loaded heat pipes comprises a gas vapor interface, and
wherein, in response to the reduction in heat transfer capacity of the one or more failed gas loaded heat pipes in the array of gas loaded heat pipes, the apparatus is configured to control a location of the gas vapor interface by controlling an amount of non-condensable gas in a gas region of the one or more operational gas loaded heat pipes adjacent to the one or more failed gas loaded heat pipes.

2. The apparatus of claim 1, wherein the operational gas loaded heat pipes adjacent to the one or more failed gas loaded heat pipes are configured to remain near or at normal temperature condition while absorbing the additional heat.

3. The apparatus of claim 1, wherein each of the gas loaded heat pipes in the array of gas loaded heat pipes are single ended gas loaded heat pipes or double ended gas loaded heat pipes.

4. The apparatus of claim 3, wherein the operational gas loaded single ended or double ended heat pipes are configured to experience little or no temperature change while absorbing additional energy in response to one or more adjacent failed gas loaded heat pipes.

5. The apparatus of claim 4, wherein each of the gas loaded single ended or double ended heat pipes comprises a condenser, and the operational gas loaded single ended or double ended heat pipes are configured to block or reduce temperature fluctuations while absorbing the additional energy by increasing surface area in the condenser exposed to a heat exchanger through gas compression.

6. The apparatus of claim 3, wherein each end of the double ended heat pipes comprises a valve controller configured to inject gas into a gas region by way of a tube to control the location of the gas vapor interface, thereby controlling heat transfer to a heat exchanger.

7. The apparatus of claim 6, wherein the valve controller is further configured to remove gas from the gas region by way of evacuation.

8. An apparatus configured to mitigate creep or cascade failure in a high temperature heat pipe reactor core (reactor core) under a failed condition, the apparatus comprising:
a plurality of fuel pins within the reactor core; and
a plurality of variable conductance gas loaded heat pipes within the reactor core,
wherein each of the plurality of fuel pins is surrounded by a predefined number of variable conductance gas loaded heat pipes,
wherein a portion of the variable conductance gas loaded heat pipes is enclosed within a heat exchanger,
wherein one or more of the plurality of variable conductance gas loaded heat pipes are configured to increase heat absorption in response to one or more adjacent failed variable conductance gas loaded heat pipes of the plurality of variable conductance gas loaded heat pipes,
wherein the variable conductance gas loaded heat pipes non-adjacent to the one or more failed variable conductance gas loaded heat pipes are configured to remain at or near a stable temperature while absorbing additional heat,
wherein each of the variable conductance gas loaded heat pipes adjacent to the one or more failed variable conductance gas loaded heat pipes comprises a gas vapor interface, and
wherein the apparatus is configured to control a location of the gas vapor interface by controlling an amount of non-condensable gas in a gas region of the one or more variable conductance gas loaded heat pipes to absorb the additional heat from the failure of the one or more failed variable conductance gas loaded heat pipes.

9. The apparatus of claim 8, wherein the plurality of variable conductance gas loaded heat pipes are arranged in an array, a cluster, or both.

10. The apparatus of claim 8, wherein each of the one or more variable conductance gas loaded heat pipes adjacent to the one or more failed variable conductance gas loaded heat pipes is configured to absorb the additional heat by increasing an area in a condenser section by compressing the non-condensable gas.

11. The apparatus of claim 8, wherein each heat pipe of the plurality of variable conductance gas loaded heat pipes comprises:
one or more sensors placed along a length of each variable conductance gas loaded heat pipe of the plurality of variable conductance gas loaded heat pipes; and
one or more integral derivative controllers configured to use feedback from the one or more sensors to control the amount of the non-condensable gas to change the location of the gas vapor interface.

12. The apparatus of claim 8, wherein each variable conductance gas loaded heat pipe of the plurality of variable conductance gas loaded heat pipes comprises:
one or more reentrant tubes situated at a condenser end of the variable conductance gas loaded heat pipe,
wherein, in response to the one or more variable conductance gas loaded heat pipes failing in an array of variable conductance gas loaded heat pipes, the one or more reentrant tubes are further configured to mitigate creep and prevent cascade failure by allowing gas from a valve controller to flow into a gas region and avoid liquid from entering the one or more reentrant tubes.

13. The apparatus of claim 8, wherein each variable conductance gas loaded heat pipe is configured to mitigate creep, cascade failure, or both, within the reactor core.

14. The apparatus of claim 13, wherein each variable conductance gas loaded heat pipe of the plurality of variable conductance gas loaded heat pipes is loaded with gas at one end or both ends of the variable conductance gas loaded heat pipe.

15. The apparatus of claim 14, wherein each variable conductance gas loaded heat pipe of the plurality of variable conductance gas loaded heat pipes comprises a tube situated at one or both ends of the variable conductance gas loaded heat pipe to allow gas to be injected into one or more gas regions of the variable conductance gas loaded heat pipe.

16. The apparatus of claim 15, wherein each of the plurality of variable conductance gas loaded heat pipes comprises a valve controller at one or both ends of the variable conductance gas loaded heat pipe, the valve controller attached to the tube to allow gas to be injected into the one or more gas regions of the variable conductance gas loaded heat pipe.

17. The apparatus of claim 16, wherein the valve controller is configured to remove gas from the one or more gas regions by way of evacuation.

\* \* \* \* \*